Nov. 26, 1957
L. R. HUSSA
2,814,372
POWER TAKE-OFF DEVICE
Filed April 3, 1953
2 Sheets-Sheet 1
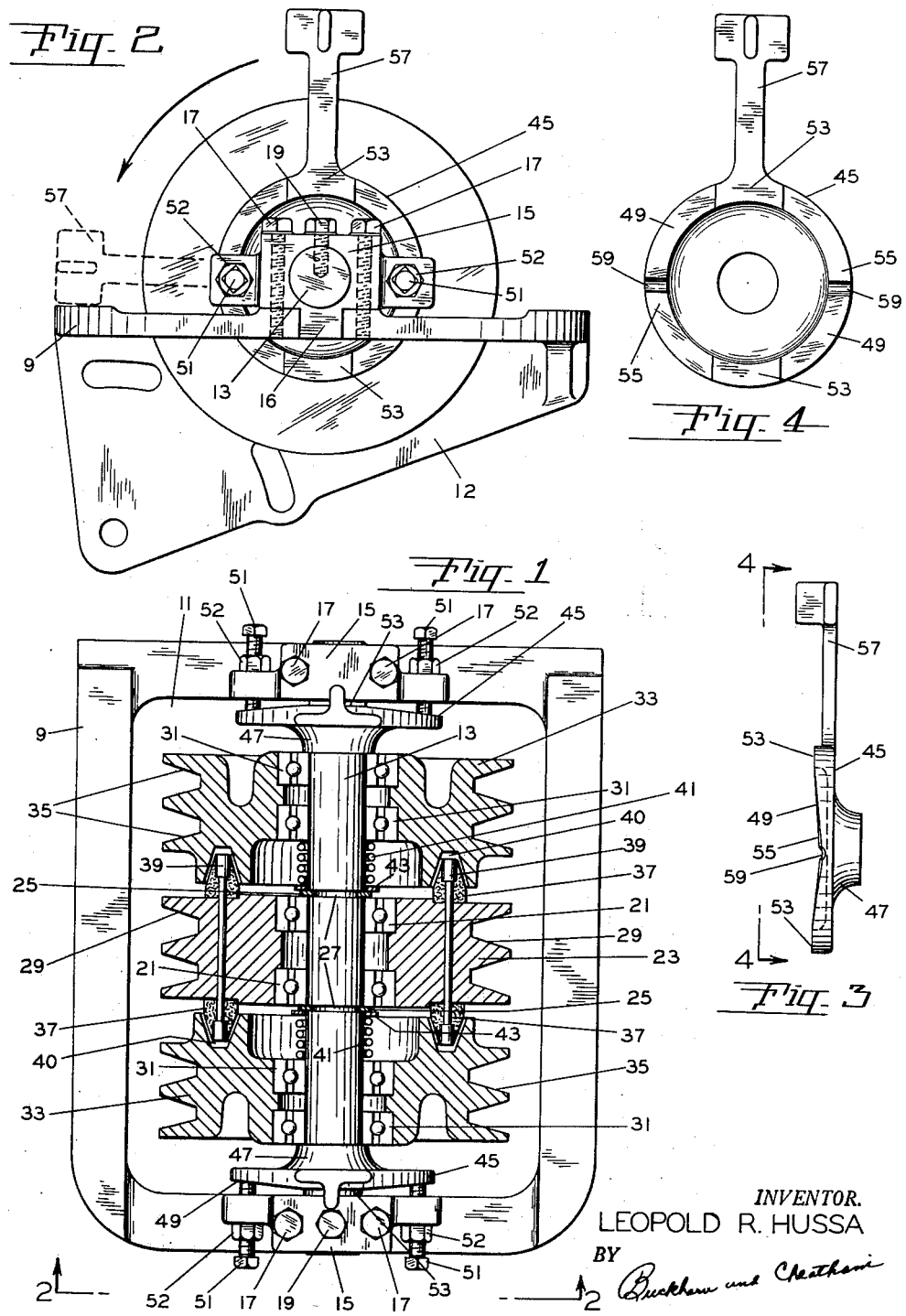
INVENTOR.
LEOPOLD R. HUSSA
BY
Buckhorn and Cheatham
ATTORNEYS Nov. 26, 1957 L. R. HUSSA 2,814,372
POWER TAKE-OFF DEVICE
Filed April 3, 1953 2 Sheets-Sheet 2
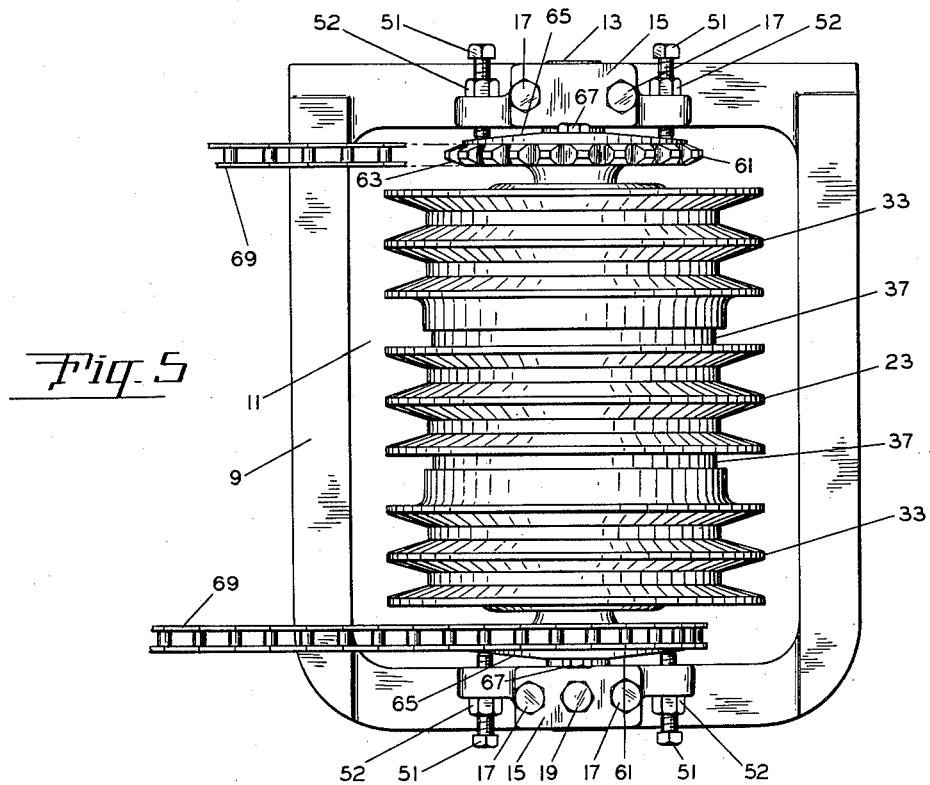
*Fig. 5*
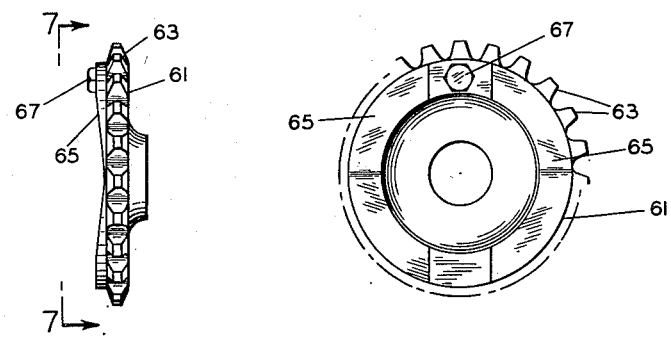
*Fig. 6*     *Fig. 7*
INVENTOR.
LEOPOLD R. HUSSA
BY
Buckhorn and Cheatham
ATTORNEYS United States Patent Office 2,814,372
Patented Nov. 26, 1957

2,814,372

POWER TAKE-OFF DEVICE

Leopold R. Hussa, Portland, Oreg.

Application April 3, 1953, Serial No. 346,579

2 Claims. (Cl. 192—48)

This invention relates to power take-off units, and particularly to improvements in power take-off units of the type disclosed in my prior Patent No. 2,496,538, entitled "Power Take-Off," granted February 7, 1950. The present application is copending with my concurrently filed application for "Power Take-Off Unit," Serial No. 344,-365, filed March 24, 1953, now Patent Number 2,767,816.

The type of power take-off unit shown in the above-mentioned patent and under present consideration is adapted to be installed adjacent a source of power to be driven therefrom, and to deliver power, at the option of the operator, to utility units located adjacent to or in the vicinity of the power take-off unit.

The power take-off unit of my prior patent, above identified, includes a pair of power take-off sheaves disposed one on either side of a center sheave driven from a source of power. The sheaves are independently, rotatably mounted on a shaft supported by a frame. Arranged between the power take-off sheaves and the center sheave are friction drive means carried by the center sheave. A pair of levers are pivotally mounted on the frame and pivotally connected to thrust collars slidably mounted on the shaft adjacent the outer faces of the power take-off sheaves.

When the levers are moved in predetermined directions, the power take-off sheaves are forced, through the thrust collars, into driving relationship with the friction drive means to establish a drive between the center sheave and either or both of the power take-off sheaves, depending on whether one or both of the levers are actuated. Springs are provided to urge the power take-off sheaves away from the center sheave and the friction means so that, until the levers are actuated, the power take-off sheaves will remain idle.

A main object of the present invention is to provide a device accomplishing the same results as obtained in my prior unit, but having fewer parts. Specifically, it is an object of the present invention to provide a power take-off device as generally described above, but differing therefrom in that each lever, the associated thrust collar and pivots connecting such parts are replaced by a unitary rotary sheave actuator mounted on the sheave shaft and operable when rotated to axially shift the associated power take-off sheave into driving engagement with the friction drive means.

Another object of the present invention is to provide a power take-off unit of the type described immediately above, wherein the sheave actuators are adapted to be manually operated at the unit; and also to provide a unit wherein the sheave actuators are adapted to be remotely controlled.

An advantageous operating feature of my prior device is that, when the levers are released, the power take-off sheaves are automatically disengaged from the friction drive means by the springs acting against the power take-off sheaves. However, a disadvantageous operating feature of this construction is that a lever must be held in its engaged position, normally by latching or locking a remotely located lever control handle in its engaged position, in order to maintain a driving relationship between the associated power take-off sheave and the friction drive means. That is, the lever will not remain in its operative position when thrown to such position.

Another object of the present invention is to provide an actuator for a power take-off sheave which, when moved to its operable or engaged position, will remain in such position until moved therefrom.

A further object of the present invention is to provide a power take-off device having rotary sheave actuators as above outlined, wherein there are means for axially adjusting these actuators, and therefore the power take-off sheaves, toward and away from the center sheave, whereby initial adjustment of the power take-off device may be effected to insure proper driving engagement between the power take-off sheaves and the friction means, when the sheave actuators are moved to their operative positions; and whereby, when the friction drive means wears, appropriate adjustment of the adjustment means may be made to insure that when the actuators are thrown to their operative or engaged positions proper driving engagement of the power take-off sheaves and the friction drive means will occur despite the reduced size of the friction drive means caused by such wear.

For a consideration of what is believed novel and inventive, attention is directed to the following description, taken in connection with the accompanying drawings, while the features of novelty will be pointed out with greater particularity in the appended claims.

In the drawings:

Fig. 1 is a plan view of a power take-off device embodying the concepts of the present invention, the sheave units being shown in section for convenience in illustration;

Fig. 2 is an end view of the device depicted in Fig. 1, taken in the direction of the arrows 2—2 in Fig. 1;

Fig. 3 is a side elevation of a sheave actuator;

Fig. 4 is a view of the sheave actuator taken in the direction of the arrows 4—4 of Fig. 3;

Fig. 5 is a plan view of a modified form of power take-off device;

Fig. 6 is a side view of a sprocket-type sheave actuator shown in Fig. 5; and

Fig. 7 is a view of the actuator taken in the direction of the arrows 7—7 in Fig. 6.

Referring to the accompanying drawings wherein similar reference characters designate similar parts throughout, the power take-off device disclosed includes a frame 9 of generally rectangular configuration in plan and formed with a generally rectangular, sheave-accommodating opening 11, and having a slotted depending flange 12 by which the frame may be mounted on a supporting structure. Supported by the frame is a stationary shaft 13 received at its ends by pillow blocks 15, the latter having depending lugs 16 fitting within mating slots formed in the frame and being secured by bolts 17 to said frame.

A screw 19 threads into the lower pillow block, as the parts are depicted in Fig. 1, and fits into and bottoms against a mating hole formed in the shaft to prevent rotation of the shaft.

Mounted centrally on shaft 13 by radial thrust bearings 21 is a center sheave 23 counterbored to receive the outer races of the bearings and adapted to be belt-driven from a source of power (not shown). Split rings 25 fit within annular grooves 27 formed in the shaft to prevent endwise movement of the bearings and thus of the center sheave. The center sheave has formed peripherally therearound one or more belt-receiving grooves 29, two of such grooves being shown.

Disposed one on either side of the center sheave 23 and mounted on the shaft 13 by radial thrust bearings 31 are a pair of power take-off sheaves 33 counterbored to receive the outer races of the bearings. The inner races of bearings 31 are dimensioned to slidably fit on shaft 13 to permit endwise movement of the power take-off sheaves toward and away from center sheave 23. Each power take-off sheave has formed peripherally therearound one or more belt-receiving grooves 35, each sheave being shown with two of such grooves. Belts (not shown) are adapted to transmit power from the power take-off sheaves to devices adjacent the power take-off unit.

Arranged between the power take-off sheaves 33 and the center sheave 23 are annular friction drive elements 37 secured by rivets 39 to the center sheave 23. Each power take-off sheave is provided on its inner face with an annular groove 40 complementary in formation to the configuration of the opposing friction drive element, thus providing a mating friction surface adapted to be brought into engagement with said friction drive element.

Urging the power take-off sheaves away from the center sheave are a pair of compression springs 41 located one on either side of the center sheave, within counterbores formed in the power take-off sheaves, and fitting on shaft 13. Springs 41 axially bear against the inner races of the adjacent power take-off sheave bearings and against thrust washers 43, which fit on shaft 13 and are forced into engagement with and bear against split rings 25.

Limiting outward movement of each power take-off sheave, under the influence of the associated compression spring 41, to a point where it is just out of engagement with the associated friction drive element, is a sheave actuator 45 rotatably mounted on shaft 13 and having on one side a hub portion 47 engaging the inner race of the adjacent bearing, and having on its other side an annular cam surface 49 bearing against a pair of spaced bolts 51 threadedly received by the associated pillow block 15. Jam nuts 52 are provided on bolts 51 to hold them in any position of adjustment. Each cam 49 is formed with two rise portions 53 and two recessed portions 55, which portions are arranged with relation to the associated bolts 51 so that the cam surface always symmetrically engage the said bolts.

For turning or rotating the sheave actuators, each actuator is provided with a handle 57 which is designed to extend upwardly, as shown in full lines in Fig. 1, when the recessed portions 55 of the cam of the actuator are in engagement with the associated bolts 51. It is thus evident that when the handles extend upwardly the sheave actuators, and therefore the power take-off sheaves, are in their inoperative positions.

Releasably latching each actuator in its inoperative position are grooves 59 formed in recessed portions 55, said grooves having a releasable detenting action with the bolts under the influence of springs 41. When an actuator is moved downwardly ninety degrees from the full line position to the broken line position shown in Fig. 2, the rise portions 53 of the actuator cam are brought into registry with bolts 51 to thus cam the actuator, together with the associated power take-off sheave, toward the center sheave and therefore effect a driving engagement of the associated power take-off sheave with the associated friction drive element.

As is apparent from Fig. 1, each rise portion 53 of a cam is flat at its peak, so that when an actuator is thrown to its operative or engaged position, the flats will be brought into engagement with the associated bolts and thus the actuator will remain in its operative or engaged position. When an actuator is thereafter thrown or moved to its inoperative or disengaged position, the associated power take-off sheave will automatically return to its disengaged position under the influence of the associated compression spring.

A modified form of the invention is shown in Figs. 5, 6 and 7, where the similar reference numerals indicate that in many respects the device is similar to the device of Figs. 1 to 4. The modified device differs from the previously described device in that the sheave actuator of the modified device, indicated by the reference numeral 61, has sprocket teeth 63 formed therearound. Each actuator has an annular cam surface 65 identical in configuration to cam 49 of the first described device. A stop screw 67 may be provided on each sprocket to limit rotary movement thereof.

In use, actuating chains 69 are trained about the sprockets and, when the chains are moved, the actuators will be rotated to axially move or shift the power take-off sheaves into driving engagement with the friction drive elements. A reverse movement of the chains will cause disengagement of the power take-off sheaves and the friction drive elements. Since cams 65 of the sprocket-type actuators are identical with the cams 49 of the previously described device, cams 65 are provided with detenting grooves and flat portions on the rise portions of the cams, so that the sprocket-type actuators will remain in either their inoperative or operative positions, once moved to those positions, until moved therefrom.

The advantages of the above-described take-off devices include the fact that a single actuator has been provided to replace the lever, its thrust collar, and the two pivot bolts connecting these parts. When the friction drive elements wear, bolts 51 may be threaded inwardly to compensate for the wear. Further, the sheave actuator in each of the above-described devices will remain in either its operative or inoperative position until moved therefrom.

Having described the invention in what are considered to be preferred embodiments thereof, it is desired that it be understood that the specific details shown are merely illustrative and that the invention may be carried out in other ways.

What I claim as my invention is:

1. A power take-off unit comprising a frame, a countershaft fixed to said frame, a center driving sheave rotatably mounted on said countershaft in an axially stationary position, a pair of driven sheaves rotatably mounted on said countershaft on the opposite sides of said center sheave for sliding movement along said countershaft from inoperative positions spaced from said center sheave to operative positions in engagement with said center sheave, a cam for each driven sheave, each cam being mounted on said countershaft adjacent the outer face of the associated driven sheave for pivotal movement about said countershaft and for sliding movement therealong, a pair of cam engaging members for each cam located adjacent the outer face thereof, each pair of cam engaging members being mounted on said frame adjacent the associated cam on opposite sides of said countershaft in engagement with the cam surface of the associated cam so that when the associated cam is pivoted in one direction the associated cam is caused to axially move to shift the associated driven sheave into driving engagement with said center sheave and when pivoted in the opposite direction to release the associated driven sheave for return movement to its inoperative position, said cam engaging members being in the form of screws threadedly received through portions of said frame so as to be adjustable in an axial direction toward said center sheave to vary the pressure with which said driven sheaves engage said center sheave.

2. A power take-off unit comprising a frame, a countershaft fixed to said frame, a center driving sheave rotatably mounted on said countershaft in an axially stationary position, a pair of driven sheaves rotatably mounted on said countershaft on the opposite sides of said center sheave for sliding movement along said countershaft from inoperative positions spaced from said center sheave to operative positions in engagement with said center sheave, a cam for each driven sheave, each cam being mounted on said countershaft adjacent the outer face of the associated sheave for pivotal movement about said countershaft and for sliding movement therealong, stationary cam engaging means for each cam located at the outer face thereof, cam engaging means being disposed in engagement with the cam surface of the associated cam so that when the associated cam is pivoted in one direction said cam is caused to move axially to shift the associated driven sheave into driving engagement with the center sheave and when pivoted in the opposite direction to release the associated driven sheave for return movement to its inoperative position, each stationary cam engaging means being mounted on said frame for adjustment in an axial direction toward said center sheave to vary the pressure with which said driven sheaves engage said center sheave when said driven sheaves are shifted from their inoperative to their operative positions.

References Cited in the file of this patent

UNITED STATES PATENTS

| | | |
|---|---|---|
| 1,014,990 | Ahlborn | Jan. 16, 1912 |
| 1,685,310 | Burrell et al. | Sept. 25, 1928 |
| 2,496,538 | Hussa | Feb. 7, 1950 |

FOREIGN PATENTS

| | | |
|---|---|---|
| 23,658 | Great Britain | Oct. 29, 1902 |